United States Patent [19]

Block et al.

[11] 4,158,908
[45] Jun. 26, 1979

[54] SECUREMENT OF HEAT EXCHANGER SURFACES TO TUBES AND METHOD OF FABRICATION

[75] Inventors: Leo Block, Westlake Village; Larry J. Ashton, Thousand Oaks, both of Calif.

[73] Assignee: Raypak, Inc., Westlake Village, Calif.

[21] Appl. No.: 602,592

[22] Filed: Aug. 7, 1975

Related U.S. Application Data

[63] Continuation-in-part of Ser. No. 506,226, Sep. 16, 1974, abandoned.

[51] Int. Cl.² .............................................. B23P 15/26
[52] U.S. Cl. ......................... 29/157.3 C; 29/157.3 A; 113/118 A; 113/1 N; 113/118 C; 113/118 V
[58] Field of Search ............... 165/172, 175, 178, 171; 248/49, 68 R, 68 CB; 138/106, 111, 112, 113; 29/157.3 A, 157.3 B, 157.3 C; 113/1 N, 118 R, 118 A, 118 B, 118 C, 118 V

[56] References Cited

U.S. PATENT DOCUMENTS

| | | | |
|---|---|---|---|
| 1,982,075 | 11/1934 | Smith | 165/171 X |
| 3,280,530 | 10/1966 | Rothenbach | 165/171 X |
| 3,379,241 | 4/1968 | Gau | 165/171 X |
| 3,735,465 | 5/1973 | Tibbetts et al. | 29/521 |
| 3,962,766 | 6/1976 | Pompidor et al. | 29/157.3 B |

*Primary Examiner*—Francis S. Husar
*Assistant Examiner*—V. K. Rising
*Attorney, Agent, or Firm*—Albert M. Herzig; Edward C. Walsh

[57] ABSTRACT

Securement of flat heat exchange surfaces, particularly fins to tubular conduits of a heat exchanger. The heat exchange material has longitudinal, partially circular recesses parallel to the length of a tube for engaging opposite sides of the tube. The radii of the recesses corresponds to the outer diameter of the tube. The recesses extend through less than 180° so that the flat parts of the heat exchange surface are spaced prior to securement to the tubes. Forces are applied normally to the surfaces, forcing them together, stretching the heat exchange material at the recesses, thereby producing a tight interference fit between the heat exchange surfaces and the tube to provide minimum resistance to conduction of heat. Securement may be by spot welding, riveting, or otherwise. The tube remains round and undeformed so the cross sectional heat exchange area remains the same.

4 Claims, 8 Drawing Figures

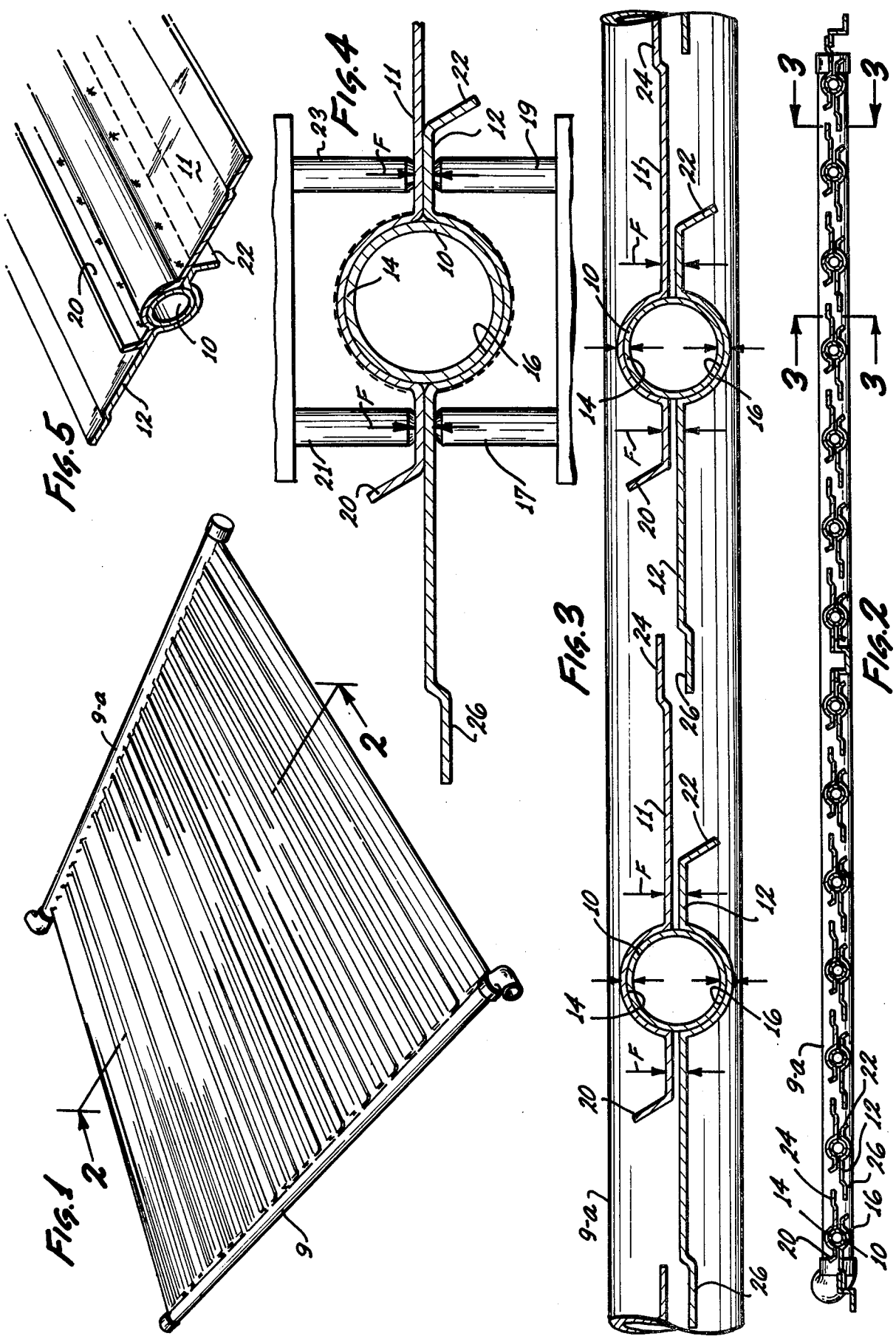

SECUREMENT OF HEAT EXCHANGER SURFACES TO TUBES AND METHOD OF FABRICATION

This application is a continuation in part of Ser. No. 506,226, filed 9/16/74 now abandoned.

BACKGROUND OF THE INVENTION

1. Field of the Invention

The invention resides in the field of heat exchangers, and more particularly, in the field of attachment or securement of heat exchange surfaces, particularly fins to tubular members. The invention is particularly adapted for utilization in solar heat collecting systems.

2. Description of the Prior Art

Heat exchangers comprising finned, tubular members are well known. With respect to the attachment of heat exchange surfaces or fins to tubular members, various types of construction are known. Fins may be fabricated integrally with the tubes. They may be attached by welding or soldering, that is, securing inner edges of the fins to the tubes. The fins may have flanges which are welded to the tubes. The tubes may have flanges which are brazed together forming a heat exchanger. Helical fin material may be wrapped around the tube. A typical construction involves providing holes in fin or heat exchange surfaces, the tubes being inserted through the holes and the tube diameters expanded by manual or hydraulic pressure to engage the peripheral edges of the holes.

Quite often, a thermoconductive paste is used to improve (decrease) the contact resistance. This paste is made of a highly conductive material and tends to fill up all the voids and crevices which would normally be filled with air, which is a poor conductor. However, thermoconductive paste is relatively expensive.

The prior art methods described rely on welding or increasing the diameter of the tube to obtain an interference fit.

Prior art patents are: U.S. Pat. Nos. 1,982,075; 3,280,530; and 3,379,241.

The herein invention realizes finned tube construction which is entirely unique, as is the method or technique of fabricating as described hereinafter.

SUMMARY OF THE INVENTION

The invention as stated is particularly adapted in heat exchangers for use in solar collector systems. In the preferred form of the invention as described in detail hereinafter, heat exchange members or fins have elongated partially circular recesses formed in them, the radii conforming to the outer diameter of the tube. The recesses extend angularly less than 180°. The fin surfaces adjacent to the tube are clamped together and secured by stretching the fin material without deforming the tube in a manner providing a tight interference fit and minimizing contact resistance to heat transfer. The tube remains round without reduction of heat exchange area. Clamping may be by pneumatically operated welding electrodes or by means of a riveting machine that rivets the fins together.

A primary object of the invention is to provide finned tube construction having maximum transfer capability as between the fin and tube.

A further object is to provide a construction wherein the foregoing result is achieved without deforming the tube or reducing its diameter, the fin members on opposite sides of the tube being clamped together, with stretching of the fin material which contacts the tube.

A further object is to provide a construction wherein individual fins are provided on opposite sides of the tube or alternatively, an extended heat exchange surface may be provided having parallel longitudinal recesses engageable with the tubes.

A further object is to realize the clamping, securing, and stretching of the fin material by way of pneumatically operated welding electrodes or alternatively by riveting using a riveting machine.

A further object is to provide formations on the edges of fin members to avoid undesired deformation or waving.

BRIEF DESCRIPTION OF THE DRAWINGS

Further objects and additional advantages of the invention will become apparent from the following detailed description and annexed drawings, wherein:

FIG. 1 is an isometric view of a heat exchanger embodying the invention adapted for use as solar collector system;

FIG. 2 is a sectional view taken along line 2—2 of FIG. 1;

FIG. 3 is an enlargement of FIG. 2 taken between lines 3—3 of FIG. 2;

FIG. 4 is an enlarged sectional view illustrating the construction with fins on opposite sides of the tube clamped together by means of welding electrodes.

FIG. 5 is a partial sectional isometric view illustrating the construction;

DESCRIPTION OF THE PREFERRED EMBODIMENTS

Figure 6:
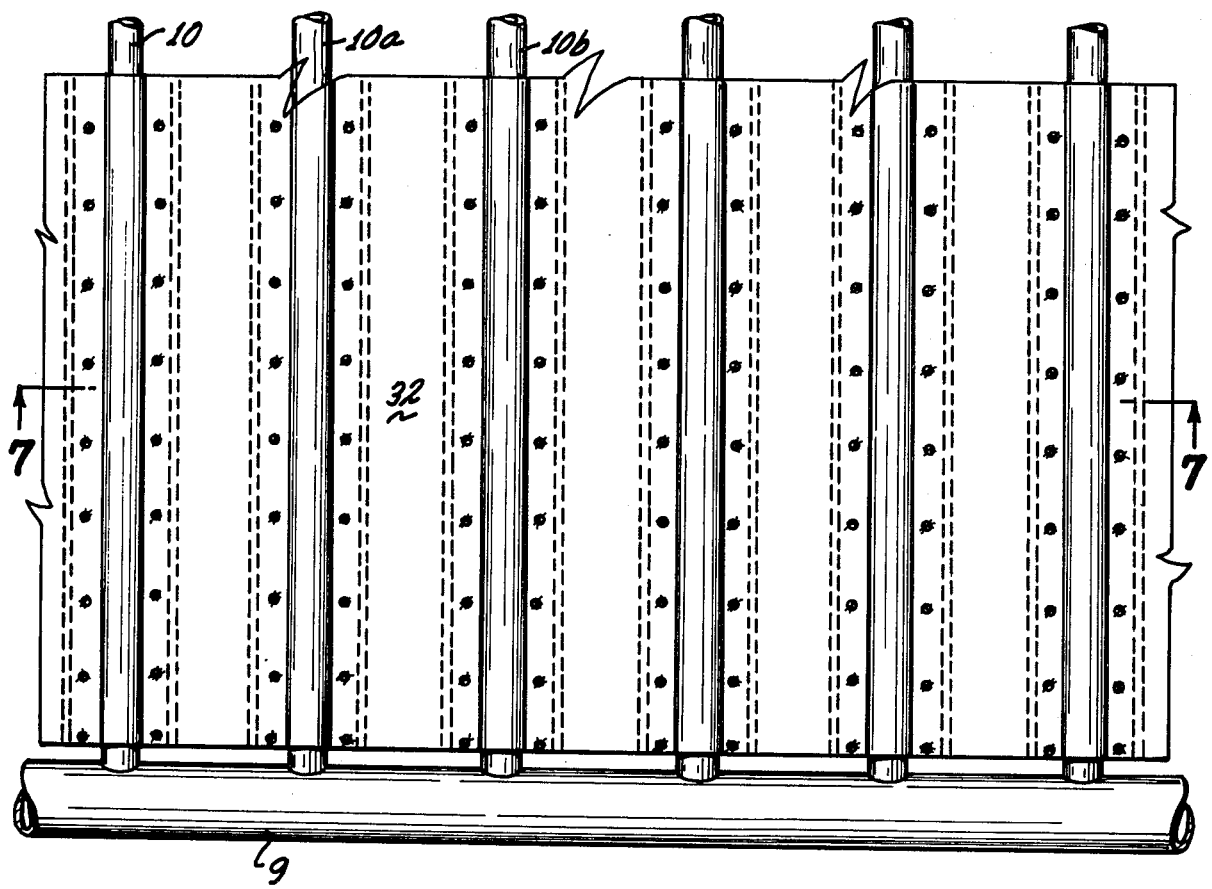
FIG. 6 is a plan view of a modified form of construction.

The solar collector system consists of several collector plates which would normally be installed on a garage roof or on some other area which is readily exposed to the sun. For example, in a typical swimming pool heater installation, the filter pump takes the suction on the water from the pool, discharges it through a filter, then through the gas-fired swimming pool heater and back into the swimming pool. When a solar collector system is used, a manual or automatic valve is located between the filter and the pool heater. This valve must be closed or at least partially closed. This diverts the water from the filter, through a T fitting and through a group of solar collector panels (arranged in parallel to minimize the pressure drop) and back to the inlet of the heater. The solar collector panels then act as a booster. If sufficient heat is absorbed in the solar collector panels, the heater thermostat senses this increase in temperature and the gas-fired heater does not cycle on.

FIG. 1 is an isometric view of the solar collector panel Several of these panels are typically used in parallel. The typical pool heater installation will require six to eight of these panels. This collector panel typically consists of several ⅜" OD copper tubes 10 to which aluminum fins 11 and 12 are attached. The finned tubes are connected to parallel headers 9 and 9A. The methods of attaching these fins to the copper tubes and the resulting construction are unique.

The aluminum fin strips are painted black and absorb solar radiation and conduct the heat towards the ⅜" diameter tubes 10. Ultimately, the heat flows through the wall of the tubes into the swimming pool water circulated through the tubes. The aluminum strip is a fin attached to the outside of a tube, as will be described. It is desired that resistance to heat flow be minimized and that the heat flow area be maximized.

The key problem in attaching the fin to the tube is to obtain minimum contact resistance to heat flow between the fin and the tube. If the fin is not rigidly attached to the tube, the contact resistance will be high and although the fin itself may be a good conductor of heat, the fin tube will be an inefficient heat transfer device because the heat will have a great deal of difficulty in flowing through the contact area.

The herein solar collector utilizes a longitudinal fin or an extended surface that runs in the same direction as the length of the tube.

FIGS. 2 through 5 show the method for attaching an aluminum sheet metal fin to the copper tube and the resulting structure. The fin is formed to the desired shape in a press brake. Substantially, the same fin strip is used about the upper half of the tube as is used about the lower half of the tube. Each strip has a longitudinal, partially circular recess of a radius to engage and interfit with the tube as shown at 14 and 16. It is necessary to apply a force at "F—F" on each side of tube 10. The application of this force stretches the material at the recesses 14 and 16 of the two fin halves or parts. The material may be aluminum 0.020 inches thick. This provides the necessary interference fit about the outside diameter of tube 10 to minimize contact resistance without deforming the tube and without reducing the area which is maximum for a circle. In this lies the basic concept of the invention; mainly, to stretch the material of the fin recesses by the application of force and thereby obtain an interference fit about a tube. The conventional method is to increase the diameter of a copper tube to obtain an interference fit.

FIG. 4 illustrates the clamping and securement by means of a spot welder which may be of conventional construction. Numerals 17 and 19 designate stationary lower tips, that is, electrodes. Numerals 21 and 23 designate the upper tips or electrodes which may be moved for clamping by pneumatic cylinder means not shown.

FIG. 3 shows the fin material before securement to the tubes and FIG. 4 illustrates the structure after securement, that is, after actuation of tips 21-23 to apply the forces, stretch the fin material, to clamp and spot weld.

The application of the force at "F—F" may be by the use of a mechanical fastener such as a bolt or nut, a rivet, by metal stitching (a stapling type fastener used with metal), or by spot or seam welding. In the preferred method, the two halves or parts are attached by spot welding. If riveting is used, the operation may be by way of a conventional riveting machine which performs the function as described except that the securement is by rivets rather than spot welds.

As may be seen in FIG. 4, the forces "F—F" stretch the material at recesses 14-16 providing a fit offering minimum resistance to heat exchange without reduction of cross-sectional flow area. A circle provides the greatest amount of flow area for a given perimeter. The greater the cross-sectional area of flow path, the less work is required to transfer heat through the path. If the tube were deformed, the flow area would be reduced and a greater amount of work would be required for transfer. The circular cross-sectional area is maintained to minimize the resistance to flow of fluid. A circle provides the greatest amount of flow area for a given perimeter.

One end of each of the strips includes a tipped-up flange as shown at 20 and 22. This allows the use of fewer supports per inch as this flange will prevent the spot weld area from bowing up between the spot weld points. The other end of each strip includes a joggle or offset as designated at 24 and 26. This offset minimizes the tendency of the raw edge of the strip to wave. One other novel feature of this invention is that the entire periphery of the tube is used to allow heat to flow from the fin to the water inside of the tube. This is not the case with conventional longitudinal fins.

Figure 7:
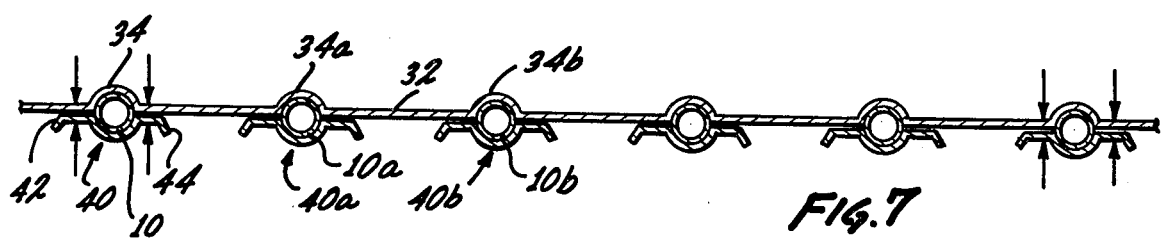
FIG. 7 is a sectional view taken along line 7—7 of FIG. 6.

FIGS. 6 and 7 show a modified form of the invention. A plurality of parallel tubes 10, 10a, 10b, etc., are shown connected to one of the headers. The heat exchange material rather than being in the form of individual fins, there is provided an extended sheet of heat exchange material 32 having in it parallel longitudinal recesses or depressions 34, 34a, 34b, etc., like those previously described which are parallel and fit over tubes 10. A second extended sheet of heat exchange material could be used. In the form of the invention shown on the opposite side of the tubes are individual heat exchange fins designated at 40, 40a, 40b, etc. These fins have parallel, elongated recesses for fitting against the tubes as previously described. The heat exchange or fin surfaces are spaced for securement. Then, they are secured in the same manner as previously described by application of forces F—F, similarly stretching the fin material for the same purpose. Each of the fins 40 has tipped up end flanges 42 and 44 for the purpose as previously described. The effect of and results of the construction as just described are those secured with the previous embodiment.

Figure 8:
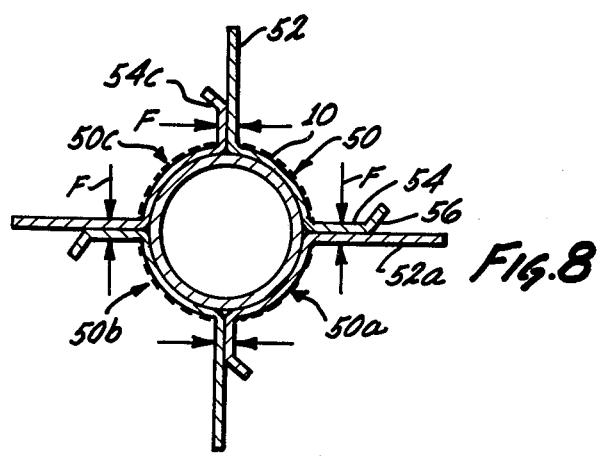
FIG. 8 is a sectional view of a modified form of the invention.

The method of attaching longitudinal fins to a tube by applying a force to stretch and clamp the fin halves or parts is not limited to arrangements as shown in FIGS. 1 through 7. The concept is also applicable to longitudinal fin arrangements where the fins extend in two planes as illustrated in the cross sectional view of FIG. 8. The same concept can be applied to any number of fins attached to the outer periphery of the tubes. In FIG. 8, instead of there being two generally semi-circular halves, fins 50, 50a, 50b and 50c are formed in quadrants. Fin quadrant 50 has a radially extending fin or heat exchange surface 52 and shorter extending flat fin surface 54 with a tipped up end flange 56. The construction of all four quadrants is alike, and they are arrayed as shown in FIG. 8. Spaced parallel heat exchange or fin surfaces are secured together as previously described, similarly maintaining tube 10 round as illustrated. Specifically, the fin parts 52 and 54c are secured. Fin parts 54 and 52a are secured, etc.

From the foregoing, those skilled in the art will readily understand the nature and the construction of the invention and the manner in which it achieves as realizes all of the objectives as set forth in the foregoing.

The foregoing disclosure is representative of preferred forms of the invention and is to be interpreted in an illustrative rather than a limiting sense.

We claim:

1. A method of construction of a heat exchanger having a tubular member comprising the steps of:

forming heat exchange material to have partially generally circular portions of an extent less than a semi-circle of a radius conforming to the tubular member and having outwardly extending parts, fitting said portions of the heat exchange material to the tubular member so that outwardly extending parts are juxtaposed adjacent to each other; leaving a space between adjacent parts on each side of the tubular member and applying forces for clamping said parts together, stretching material of said circular portions so as to close the spaces between said parts whereby the exchange materials have a tight interference fit with the tubular member, and maintaining the cylindrical shape of the tubular member.

2. A method as in claim 1, including the step of forming the heat exchange materials substantially in halves having substantially parallel radially extending flat portions, and applying clamping forces to said flat portions.

3. A method as in claim 1, including the step of forming said heat exchange materials substantially in quadrants, fitting them to the tubular member so that adjacent units have parallel, substantially radially extending flat parts and applying forces to said flat parts to clamp them together.

4. A method as in claim 1, including the step of applying the forces by a welding machine and spot welding the surfaces together.

* * * * *